United States Patent
Hayashi et al.

(10) Patent No.: US 7,560,405 B2
(45) Date of Patent: *Jul. 14, 2009

(54) OPTICAL GLASS FOR PRECISION PRESS MOLDING, PREFORM FOR PRECISION PRESS MOLDING, AND PROCESS FOR THE PRODUCTION THEREOF

(75) Inventors: Kazutaka Hayashi, Tokyo (JP); Xuelu Zou, Tokyo (JP)

(73) Assignee: HOYA Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/007,080

(22) Filed: Jan. 7, 2008

(65) Prior Publication Data

US 2008/0119348 A1    May 22, 2008

Related U.S. Application Data

(63) Continuation of application No. 11/451,421, filed on Jun. 13, 2006, now abandoned, which is a continuation of application No. 10/386,102, filed on Mar. 12, 2003, now abandoned.

(30) Foreign Application Priority Data

Mar. 18, 2002    (JP) ............................. 2002-074322

(51) Int. Cl.
*C03C 3/066*    (2006.01)
(52) U.S. Cl. .......................................... 501/79; 501/78
(58) Field of Classification Search .................. 501/50, 501/51, 78, 79, 901
See application file for complete search history.

(56) References Cited

U.S. PATENT DOCUMENTS

| 6,413,894 | B1 | 7/2002 | Sato |
| 6,844,279 | B2 | 1/2005 | Hayashi et al. |
| 6,912,093 | B2 | 6/2005 | Endo |
| 6,977,232 | B2 | 12/2005 | Hayashi et al. |
| 2003/0100433 | A1 | 5/2003 | Hayashi et al. |
| 2003/0211929 | A1 | 11/2003 | Hayashi et al. |
| 2004/0235638 | A1 | 11/2004 | Uehara et al. |
| 2005/0049135 | A1 | 3/2005 | Hayashi |
| 2006/0234850 | A1 | 10/2006 | Hayashi et al. |

FOREIGN PATENT DOCUMENTS

| CN | 1323281 | A | 11/2001 |
| JP | 54-90218 | | 7/1979 |
| JP | 56078447 | A | 6/1981 |
| JP | 62-100449 | | 5/1987 |
| JP | 8-217484 | | 8/1996 |
| JP | 10-226533 | | 8/1998 |
| JP | 2001-130924 | | 5/2001 |
| JP | 2004175632 | A | 6/2004 |
| JP | 2005015302 | A | 1/2005 |
| JP | 2005047732 | A | 2/2005 |
| JP | 2005179142 | A | 7/2005 |

OTHER PUBLICATIONS

Derwent Abstract 1981-59458D, abstract of Japanese Patent Publication 56-78447 A.
Derwent Abstract 1987-167506, abstract of Japanese Patent Publication 62-100449 A.

*Primary Examiner*—Karl E Group
*Assistant Examiner*—Elizabeth A Bolden
(74) *Attorney, Agent, or Firm*—Nixon & Vanderhye P.C.

(57) ABSTRACT

A high-refractivity high-dispersion optical glass for producing an optical element, which requires no machining, such as polishing or lapping, of an optical-function surface after precision press molding, containing $B_2O_3$, $SiO_2$, $La_2O_3$, $Gd_2O_3$, ZnO, $Li_2O$, $ZrO_2$ and $Ta_2O_5$ as essential components, containing 0 to 1 mol % of $Sb_2O_3$ as an optional component, substantially containing none of PbO and $Lu_2O_3$, having a glass transition temperature of 630° C. or lower, and (1) having a refractive index nd and an Abbe's number νd which satisfy all of the following relational expressions, $1.80 < nd \leq 1.90$, $35 < vd \leq 50$, and $nd \geq 2.025 - (0.005 \times vd)$ or (2) having an nd of greater than 1.85 and a vd of greater than 35.

6 Claims, 2 Drawing Sheets

OPTICAL GLASS FOR PRECISION PRESS MOLDING, PREFORM FOR PRECISION PRESS MOLDING, AND PROCESS FOR THE PRODUCTION THEREOF

This application is a continuation of application Ser. No. 11/451,421 filed Jun. 13, 2006 (now abandoned), which in turn is a continuation of Ser. No. 10/386,102 filed Mar. 12, 2003 (now abandoned) which claims priority of Japanese application Ser. No. 2002-74322 filed Mar. 18, 2003, the entire content of which is hereby incorporated by reference in this application.

TECHNICAL BACKGROUND

1. Field of the Invention

The present invention relates to an optical glass for precision press molding, a preform for precision press molding, an optical element, and processes for the production of the preform and the optical element. More specifically, the present invention relates to a high-refractivity low-dispersion optical glass which does not require machining of an optical-function surface such as polishing or lapping after precision press molding thereof and which is used for producing an optical element such as an ultra-precision aspherical lens, a precision press molding preform made of the optical glass, an optical element made of the same, and processes for the production of the above preform and optical element.

2. Prior Art

In recent years, digital cameras have appeared, and as the integration and function of machines and devices using an optical system are rapidly enhanced, it is increasingly demanded to enhance the precision of the optical system and to decrease the optical system in weight and size. For materializing the above demands, optical designing using an aspherical lens is coming to be a mainstream. For stably supplying a large volume of aspherical lenses made of a high-functional glass at a low cost, therefore, attention is actively paid to a mold shaping technique of directly forming an optical surface by press molding without polishing and lapping, and demands for an optical glass having high functionality (e.g., high refractivity and low-dispersion/high refractivity and high-dispersion) and being suitable for mold-shaping are increasing year after year.

Precision press molding of glass is a technique of shaping a glass preform under pressure at a high temperature into a glass shaped article having a form and a surface accuracy of an end article or a form and a surface accuracy very close to those of an end article. The above precision press molding enables the highly productive production of shaped articles (molded articles) having a desired form. At present, therefore, the precision press molding is employed to produce optical parts such as spherical lenses, aspherical lenses and diffraction gratings, and the like. For producing an optical glass part by precision press-molding, naturally, it is required to shape a glass preform under pressure at a high temperature as described above, so that a mold used for the pressing is exposed to a high temperature and that a high pressure is applied thereto. It is therefore suppressing the damage that is may be caused on the mold itself and a release film provided on an inner surface of the mold by the high-temperature environment of the press molding, it is desired to decrease the glass transition temperature Tg and sag temperature Ts of a gob preform for glass molding such that they are as low as possible.

As an optical glass having high-refractivity low-dispersion (refractive index nd>1.8 and Abbe's number vd>35) optical constants, various glasses containing $B_2O_3$ and $La_2O_3$ are conventionally known. For example, such glasses are disclosed in JP-A-8-217484, JP-A-54-90218 and JP-A-62-100449.

However, the above optical glasses aim at an improvement in devitrification resistance, and there is therefore involved a problem that expensive components such as $Lu_2O_3$, etc., are essential, or that a large amount of $Sb_2O_3$ that is a harmful component is essentially incorporated, for improving such optical glasses in stability. Further, of glass compositions disclosed in the above Publications, compositions that can attain a refractive index nd>1.8 and an Abbe's number vd>35 very useful for optical designing contain almost no ZnO or $Li_2O$ that is said to be effective for decreasing the glass transition temperature, so that they have poor suitability to press molding.

As described above, there has not been proposed any optical glass which attains a refractive index nd>1.8 and an Abbe's number vd>35 (provided that a range surrounded by three points (nd, vd)=(1.85, 35), (1.8, 45) and (1.8, 35) is excluded), or particularly, there has not yet been proposed any optical glass for precision press molding which has optical constants, a refractive index nd>1.85 and an Abbe's number vd>35.

The reason therefor is presumably as follows. Generally, a glass having such optical constants has a large content of rare earth metal oxide component and has a low degree of stabilization against devitrification, so that it has been difficult to develop a composition that makes it possible to decrease the glass transition temperature to a region in which the glass can be press molded economically.

SUMMARY OF THE INVENTION

Under the circumstances, it is an object of the present invention to provide a high-refractivity low-dispersion optical glass which does not require machining of an optical-function surface, such as polishing or lapping, after precision press molding thereof and which is used for producing an optical element, a precision press molding preform made of the above optical glass, an optical element made of the above glass, and processes for the production of the above preform and the above optical element.

For achieving the above object, the present inventors have made diligent studies and as a result, it has been found that the above object can be achieved by an optical glass containing specific components as essential components and having a glass transition temperature of a specific value or smaller and specific optical constants. On the basis of the finding, the present invention has been completed.

That is, the present invention provides (1) an optical glass for precision press molding (to be referred to as "optical glass I" hereinafter) comprising $B_2O_3$, $SiO_2$, $La_2O_3$, $Gd_2O_3$, ZnO, $Li_2O$, $ZrO_2$ and $Ta_2O_5$ as essential components, containing 0 to 1 mol % of $Sb_2O_3$ as an optional component, substantially containing none of PbO and $Lu_2O_3$, having a glass transition temperature of 630° C. or lower, and having a refractive index nd and an Abbe's number vd which satisfy all of the following relational expressions, $1.80 < nd \leq 1.90$ $35 < vd \leq 50$, and $nd \geq 2.025 - (0.005 \times vd)$, (2) an optical glass for precision press molding (to be referred to as "optical glass II" hereinafter) comprising $B_2O_3$, $SiO_2$, $La_2O_3$, $Gd_2O_3$, ZnO, $Li_2O$, $ZrO_2$ and $Ta_2O_5$ as essential components, containing 0 to 1 mol % of $Sb_2O_3$ as an optional component, substantially containing none of PbO and $Lu_2O_3$, having a glass transition temperature of 630° C. or lower, and having a refractive index nd of greater than 1.85 and an Abbe's number vd of greater than 35, (3) an optical glass (to be referred to as "optical glass III" hereinafter) comprising, as essential components and by mol %, 15 to 40% of $B_2O_3$, 3 to 25% of $SiO_2$, 5 to 20% of $La_2O_3$, 5 to 20% of $Gd_2O_3$, 2 to 35% of ZnO, 0.5 to 15% of $Li_2O$, 0.5 to 15% of $ZrO_2$ and 0.2 to 10% of $Ta_2O_5$, containing 0 to 15% of $WO_3$, 0 to 8% of $Y_2O_3$, 0 to 8% of $Yb_2O_3$ and 0 to 1% of $Sb_2O_3$ as optional components, and further containing $Nb_2O_5$, BaO and $GeO_2$ as optional components, the total content of the above components being at least 95%, the optical glass substantially containing none of PbO and $Lu_2O_3$, having a glass transition temperature of 630° C. or lower, and having a refractive index nd and an Abbel's number vd which satisfy all of the following relational expressions, $$1.80 < nd \leq 1.90$$

$$35 < vd \leq 50, \text{ and}$$

$$nd \geq 2.025 - (0.005 \times vd),$$

(4) an optical glass as recited in the above (1), (2) or (3), which contains $La_2O_3$, $Gd_2O_3$, $Yb_2O_3$, $Y_2O_3$ and $Sc_2O_3$, the total content of $La_2O_3$, $Gd_2O_3$, $Yb_2O_3$, $Y_2O_3$ and $Sc_2O_3$ being 12 to 32 mol %, the molar ratio of the content of $La_2O_3$ to said total content being 0.35 to 0.66, (5) a preform for precision press molding which is made of the optical glass recited in any one of the above (1) to (4), (6) an optical element which is made of the optical glass recited in any one of the above (1) to (4), (7) a process for the production of a preform for precision press molding, which comprises flowing a molten glass made of the optical glass recited in any one of the above (1) to (4) from a flow pipe, isolating molten glass having a predetermined weight, and shaping the isolated molten glass having the predetermined weight while the isolated molten glass is in a softened state, and (8) a process for the production of an optical element which comprises heating a preform made of an optical glass to soften the preform and producing the optical element from the softened preform by precision press molding, said preform being the preform recited in the above (5) or the preform produced by the method recited in the above (7).

DETAILED DESCRIPTION OF THE INVENTION

The "press molding" in the present invention refers to a press molding method in which a glass material is heated to bring it into a press-moldable state, and press-shaping the glass material into a product by means of a press mold thereby to precisely transfer a molding surface of the press mold to the glass material that is in the above state, whereby the product (end article) can be produced without applying machining such as polishing and lapping, etc., to the molded product after the press molding. The press molding is generally applied to the formation of optical elements (e.g., a lens, prism, and the like). In the precision press molding of an optical element, for example, the molding surface of a press mold is precisely transferred thereby to form an optical-function surface (a surface that performs an optical function like a surface which transmits or reflects light (beam) to be controlled in an optical element), so that the thus-formed optical-function surface can be allowed to exhibit performances as an optical-function surface without machining the optical-function surface after the press molding. The method of press-molding an optical element by the above method is generally called "mold optics shaping", and the method of precision press molding of an aspherical lens is particularly an excellently productive method since it is not required to polish or lap an optical-function surface into an aspherical surface.

The precision press molding is a method in which an article required to have a high surface accuracy and internal quality such as an optical element can be mass-produced highly productively. However, the glass to which the above method can be applied is limited to a glass that can undergo plastic deformation at a relatively low temperature. When a glass having a high glass transition temperature is used, the molding surface of a press-shaping mold is exposed to a high temperature during the precision press molding, so that the above molding surface is intensely worn or broken. In the precision press molding, even a fine flaw that occurs on the molding surface of a press-shaping mold is transferred to the optical-function surface of an optical element that is an end article, which means that the function of the optical element is impaired. The glass transition temperature of the glass that is usable is therefore limited to 630° C. or lower.

The optical glass of the present invention includes three embodiments, the optical glass I, the optical glass II and the optical glass III. The optical glass I will be explained first.

The optical glass I of the present invention is an optical glass containing $B_2O_3$, $SiO_2$, $La_2O_3$, $Gd_2O_3$, ZnO, $Li_2O$, $ZrO_2$ and $Ta_2O_5$ as essential components, containing 0 to 1 mol % of $Sb_2O_3$ as an optional component, substantially containing none of PbO and $Lu_2O_3$, having a glass transition temperature of 630° C. or lower, and having a refractive index nd and an Abbe's number vd which satisfy all of the following relational expressions, $$1.80 < nd \leq 1.90$$

$$35 < vd \leq 50, \text{ and}$$

$$nd \geq 2.025 - (0.005 \times vd),$$

Figure 1:
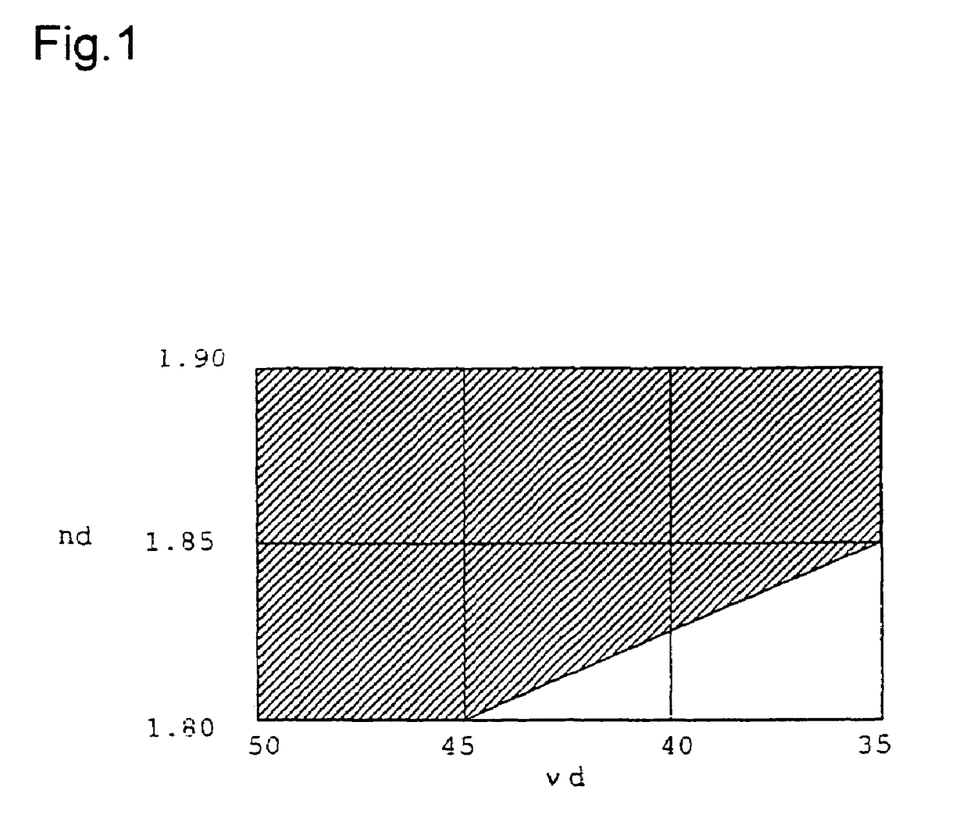
FIG. 1 is a graph showing a range of the refractive index nd and Abbe's number vd that one embodiment of the optical glass of the present invention has.

The reason why the glass transition temperature of the optical glass I is limited to 630° C. or lower is as already explained. Further, the optical glass I is required to be a high-refractivity low-dispersion optical glass having a refractive index nd and an Abbe's number vd which satisfy all of the above three relational expressions. When the above requirement is illustrated in FIG. 1, nd and vd exist in a region that is indicated by slanting lines but does not include nd 1.80 and vd 35. In FIG. 1, the axis of abscissas shows Abbe's number vd, and the axis of ordinates shows a refractive index nd.

The contents of the essential components in the above optical glass I are not specially limited so long as there can be obtained an optical glass having a glass transition temperature of 630° C. or lower and having an refractive index nd and an Abbe's number vd which satisfy all of the above three relational expressions. However, the contents of the essential components are preferably the same as those in the optical glass III to be described later. The function of each essential component will be explained later with regard to the optical glass III.

In the optical glass I, $Sb_2O_3$ as an optional component is used as an refining agent, and when it is used in an amount of 1 mol % or less, a sufficient effect can be obtained. Further, when the content of $Sb_2O_3$ is large, the molding surface of the press-shaping mold may be damaged during precision press molding. The content of $Sb_2O_3$ is therefore limited to 1 mol % or less.

Further, the optical glass I substantially contains none of PbO and $Lu_2O_3$. The above "substantially containing none of PbO and $Lu_2O_3$" means that the optical glass I contains none of these substances that are intentionally incorporated other than those included as impurities. Generally, the precision press molding is carried out in a non-oxidizing atmosphere such as a nitrogen atmosphere for protecting the molding surface of a press-shaping mold. PbO is a component that can be easily reduced, so that the surface of a molded product comes to be cloudy due to a deposit formed by reduction during the precision press. Further, since PbO is environmentally detrimental, PbO is excluded. $Lu_2O_3$ is not generally frequently used as a component for a glass as compared with other components. Further, $Lu_2O_3$ is a substance having a high scarcity value and is expensive for a raw material for an optical glass, so that it is not any component whose use is desirable. The optical glass I of the present invention has stability as a glass having the above properties, so that an unnecessary $Lu_2O_3$ is excluded.

The optical glass II of the present invention is a glass containing $B_2O_3$, $SiO_2$, $La_2O_3$, $Gd_2O_3$, ZnO, $Li_2O$, $ZrO_2$ and $Ta_2O_5$ as essential components, containing 0 to 1 mol % of $Sb_2O_3$ as an optional component, substantially containing none of PbO and $Lu_2O_3$, having a glass transition temperature of 630° C. or lower, and having a refractive index nd of greater than 1.85 and an Abbe's number vd of greater than 35.

The reason why the glass transition temperature of the optical glass II is limited to 630° C. or lower is as already explained. Further, the optical glass II is required to be a high-refractivity low-dispersion glass having a refractive index nd of greater than 1.85 and an Abbe's number vd of greater than 35.

The contents of the essential components in the above optical glass II are not specially limited so long as there can be obtained an optical glass having a glass transition temperature of 630° C. or lower and having an refractive index nd of greater than 1.85 and an Abbe's number vd of greater than 35. However, the contents of the essential components are preferably the same as those in the optical glass III to be described later. The function of each essential component will be explained later with regard to the optical glass III.

$Sb_2O_3$ as an optional component in the optical glass II is as explained with regard to the above optical glass I.

Further, the optical glass II substantially contains none of PbO and $Lu_2O_3$. These components are also as explained with regard to the above optical glass I.

The optical glass III of the present invention is an optical glass containing, as essential components and by mol %, 15 to 40% of $B_2O_3$, 3 to 25% of $SiO_2$, 5 to 20% of $La_2O_3$, 5 to 20% of $Gd_2O_3$, 2 to 35% of ZnO, 0.5 to 15% of $Li_2O$, 0.5 to 15% of $ZrO_2$ and 0.2 to 10% of $Ta_2O_5$, containing 0 to 15% of $WO_3$, 0 to 8% of $Y_2O_3$, 0 to 8% of $Yb_2O_3$ and 0 to 1% of $Sb_2O_3$ as optional components, further containing $Nb_2O_5$, BaO and $GeO_2$ as optional components, the total content of the above components being at least 95%, the optical glass substantially containing none of Pbo and $Lu_2O_3$, having a glass transition temperature of 630° C. or lower, and having a refractive index nd and an Abbe's number vd which satisfy all of the following relational expressions, $$1.80 < nd \leq 1.90$$

$$35 < vd \leq 50, \text{ and}$$

$$nd \geq 2.025 - (0.005 \times vd).$$

The reason why the glass transition temperature of the optical glass III is limited to 630° C. or lower is as already explained. Further, the optical glass III is required to be a high-refractivity low-dispersion glass having optical constants, refractive index nd and Abbe's number vd, which satisfy all of the above three relational expressions.

The above composition has been found on the basis of experimental chemistry. The unit of the contents (%) to be discussed below is mol %.

$B_2O_3$ is a network-forming oxide and an essential component in the optical glass (I, II and III) of the present invention. Particularly when a high-refractivity component such as $La_2O_3$ or $Gd_2O_3$ is incorporated in a large amount, it is required to use $B_2O_3$ as a main network-forming component for forming a glass. However, the content of $B_2O_3$ exceeds 40%, the refractive index of the glass is decreased, and the glass obtained is not suitable for obtaining a high-refractivity glass. When it is less than 15%, the glass has no sufficient stability against devitrification, and the meltability of the glass decreases, so that the content of $B_2O_3$ is preferably 15 to 40%, more preferably 20 to 37%.

$SiO_2$ is a component for forming a glass network like $B_2O_3$, and when a small amount of $SiO_2$ is incorporated into a glass containing a large amount of $La_2O_3$ and $Gd_2O_3$ as a substitute for part of $B_2O_3$ that is a main component, $SiO_2$ causes the liquidus temperature of the glass to decrease, improves the glass in high-temperature viscosity and greatly improves the glass in stability. When the content of $SiO_2$ is less than 3%, the above effects are hardly produced. When the content of $SiO_2$ exceeds 25%, the refractive index of the glass decreases, and further, the glass transition temperature increases, so that precision press molding of the glass is difficult. The content of $SiO_2$ is therefore preferably in the range of 3 to 25%, more preferably in the range of 5 to 20%.

As described already, $La_2O_3$ is an essential component that causes the refractive index to increase and improves the chemical durability of the glass without decreasing the stability of the glass against devitrification and without increasing the dispersion. However, when the content of $La_2O_3$ is less than 5%, no sufficient effect is produced, and when it exceeds 20%, the glass is greatly deteriorated in stability against devitrification. The content of $La_2O_3$ is therefore preferably in the range of 5 to 20%, more preferably in the range of 7 to 18%.

Like $La_2O_3$, $Gd_2O_3$ works to improve the glass in refractivity and chemical durability without deteriorating the stability of the glass against devitrification and the low dispersion of the glass. However, when the content of $Gd_2O_3$ is less than 5%, no sufficient effect can be obtained. When it exceeds 20%, the stability of the glass against devitrification is deteriorated, and the glass transition temperature increases, so that the precision press molding of the glass is difficult. The content of $Gd_2O_3$ is therefore preferably in the range of 5 to 20%, more preferably 6 to 18%, still more preferably 7 to 18%.

In the glass of $B_2O_3$—$SiO_2$—$La_2O_3$—$Gd_2O_3$—ZnO—$Li_2O$—$ZrO_2$—$Ta_2O_5$, generally, the total content of $La_2O_3$+$Gd_2O_3$ is adjusted preferably to at least 12%, more preferably to 12 to 32%, for maintaining high functionality of high-refractivity and low-dispersion (refractive index nd>1.8 and Abbe's number vd>35).

The amount ratio of the content of $La_2O_3$ by mol % to the total content of lanthanoid oxides $Ln_2O_3$ (Ln=La, Gd, Yb, Y, Sc) by mol % in the glass, $La_2O_3/\Sigma Ln_2O_3$, is preferably in the range of 0.35 to 0.66, more preferably 0.45 to 0.66. The reason therefor will be explained below.

In the glass for precision press molding, it is required to incorporate $Li_2O$ and the like, components that impart the glass with precision press molding suitability, i.e., a low glass transition temperature but destabilize the glass. When the content of the lanthanoid oxides essential for high refractivity and low dispersion is increased, molding of the glass comes to be impossible. Generally, the amount ($\Sigma Ln_2O_3$) is therefore limited.

However, the present inventors have found the following. Lanthanoid oxides other than $La_2O_3$ are added such that the ratio of the content of $La_2O_3$ to the total content of lanthanoid oxides $Ln_2O_3$ is 0.35 to 0.66, whereby a stable glass can be obtained while increasing the amount of the lanthanoid oxides, and the glass containing $Li_2O$, etc., components that decrease the stability of the glass can be molded as a glass. Further, it has been found that maintaining the above ratio serves to decrease the liquidus temperature and to improve the high-temperature viscosity.

That is, when the ratio of $La_2O_3/\Sigma Ln_2O_3$ is in the range of 0.35 to 0.66, a remarkably stable glass can be obtained as compared with a case where the total content $\Sigma Ln_2O_3$ is constant and the ratio of $La_2O_3/\Sigma Ln_2O_3$ is larger. For the above reason, further, it is preferred to adjust the total content ($\Sigma Ln_2O_3$) of $La_2O_3$, $Gd_2O_3$, $Yb_2O_3$, $Y_2O_3$ and $Sc_2O_3$ to 12 to 32%.

ZnO is an essential component that decreases the melting temperature, liquidus temperature and glass transition temperature of the glass and is indispensable for the adjustment of a refractive index. When the content of ZnO is less than 2%, the expected results above cannot be obtained. When the content thereof exceeds 35%, the dispersion is large, the stability against devitrification deteriorates, and the chemical durability decreases. The content of ZnO is preferably in the range of 2 to 35%, more preferably in the range of 5 to 32%.

$Li_2O$ is a component that decreases the glass transition temperature to a great extent without involving a great decrease in refractive index or a decrease in chemical durability, as compared with any other alkali metal oxide component. Particularly, when $Li_2O$ is incorporated in a small amount, the effect thereof is large for its amount, and it is effective for adjusting thermal properties of the glass. When the content of $Li_2O$ is less than 0.5%, it produces little effect. When it exceeds 15%, the stability of the glass against devitrification sharply decreases, and the liquidus temperature of the glass also increases. The content of $Li_2O$ is therefore preferably in the range of 0.5 to 15%, more preferably 1 to 12%, still more preferably 2 to 12%.

Both ZnO and $Li_2O$ are components that decrease the glass transition temperature, so that the total content of ZnO+$Li_2O$ is preferably adjusted to at least 10 mol %, more preferably to at least 15 mol %.

$ZrO_2$ is incorporated as a component for attaining high-refractivity and low-dispersion properties. When a small amount of $ZrO_2$ is incorporated, it has the effect of improving the high-temperature viscosity and the stability against devitrification, so that it is preferred to incorporate a small amount of $ZrO_2$. When the content of $ZrO_2$ is less than 0.5%, it produces little effect. When the content thereof exceeds 15%, the liquidus temperature sharply increases, and the stability against devitrification is deteriorated. Therefore, the content of $ZrO_2$ is preferably in the range of 0.5 to 15%, more preferably 1 to 10%.

$Ta_2O_5$ is incorporated as a component for attaining high-refractivity and low-dispersion properties. When a small amount of $Ta_2O_5$ is incorporated, it has the effect of improving the glass in high-temperature viscosity and stability against devitrification, so that it is preferred to incorporate a small amount of $Ta_2O_5$. When the content of $Ta_2O_5$ is less than 0.2%, it produces no effect. When it exceeds 10%, the liquidus temperature sharply increases, and the dispersion becomes large. Therefore, the content of $Ta_2O_5$ is preferably in the range of 0.2 to 10%, more preferably 1 to 8%.

$WO_3$ is a component that is incorporated as required for improving the glass in stability and meltability and improving the glass in refractivity. When the content of $WO_3$ exceeds 15%, the dispersion becomes large, and the necessary low-dispersion property can be no longer obtained. Therefore, the content of $WO_3$ is preferably 15% or less, more preferably 12% or less.

$Y_2O_3$, $Yb_2O_3$ and BaO are incorporated as component for attaining high-refractivity and low-dispersion properties. When it is incorporated in a small amount, it improves the glass in stability and chemical durability. When the content of each of individual components exceeds 8%, any one of these impairs the stability of the glass against devitrification to a great extent and increases the glass transition temperature and sag temperature. Each component is therefore preferably controlled such that the content thereof is 8% or less, more preferably, 7% or less.

$Nb_2O_5$ is a component that is incorporated as required for improving the glass in stability and refractivity. When the content thereof exceeds 8%, the dispersion becomes large, and the necessary low-dispersion property can be no longer obtained. Therefore, the content of $Nb_2O_5$ is preferably 8% or less, more preferably 5% or less.

$GeO_2$ is a component that stabilizes the glass like $SiO_2$ and imparts the glass with a higher refractive index than $SiO_2$ does. However, $GeO_2$ is expensive and increases the dispersion, so that the content of $GeO_2$ is preferably 8% or less.

Further, $Sb_2O_3$, PbO and $Lu_2O_3$ are as explained with regard to the above optical glass I.

When the optical glass has a composition containing the above optional components in the above amounts as required, there can be obtained an optical glass having qualities and properties that are explained to be preferred. Above all, the optical glass more preferably has a glass composition containing 20 to 37% of $B_2O_3$, 5 to 20% of $SiO_2$, 7 to 18% of $La_2O_3$, 6 to 18% of $Gd_2O_3$, 5 to 32% of ZnO, 1 to 12% of $Li_2O$, 1 to 10% of $ZrO_2$, 1 to 8% of $Ta_2O_5$, 0 to 12% of $WO_3$, 0 to 7% of $Y_2O_3$, 0 to 7% of $Yb_2O_3$, 0 to 5% of $Nb_2O_5$, 0 to 7% of BaO, 0 to 8% of $GeO_2$ and 0 to 1% of $Sb_2O_3$, the total content of $La_2O_3$ and $Gd_2O_3$ being 12 to 32%, $La_2O_3/\Sigma Ln_2O_3$ being 0.45 to 0.66. the optical glass more preferably has a glass composition containing 20 to 37% of $B_2O_3$, 5 to 20% of $SiO_2$, 7 to 18% of $La_2O_3$, 7 to 18% of $Gd_2O_3$, 5 to 32% of ZnO, 2 to 12% of $Li_2O$, 1 to 10% of $ZrO_2$, 1 to 8% of $Ta_2O_5$, 0 to 12% of $WO_3$, 0 to 7% of $Y_2O_3$, 0 to 7% of $Yb_2O_3$, 0 to 5% of $Nb_2O_5$, 0 to 7% of BaO, 0 to 8% of $GeO_2$ and 0 to 1% of $Sb_2O_3$, the total content of $La_2O_3$ and $Gd_2O_3$ being 12 to 32%, $La_2O_3/\Sigma Ln_2O_3$ being 0.45 to 0.66.

In the above composition, the above more preferred composition and the above particularly preferred composition, it is important that the total content of the above components is at least 95% for obtaining the desired optical properties and at the same time for maintaining the stability of the glass. The optical glass may contain other components such as $Na_2O$, $K_2O$, CaO, SrO, $TiO_2$, $Al_2O_3$, $Ga_2O_3$, and the like in a total content of 5% or less for adjusting properties of the glass.

In the above glass composition and the above more preferred composition, preferably, the total content of $B_2O_3$, $SiO_2$, ZnO, $Li_2O$, $La_2O_3$, $Gd_2O_3$, $ZrO_2$, $Ta_2O_5$, $WO_3$, $Y_2O_3$ and $Yb_2O_3$ is at least 95%, and more preferably, the above total content is at least 99%. Still more preferably, the above total content is 100%.

Desirably, the optical glass (any one of the optical glasses I, II and III) of the present invention does not contain any environmentally detrimental elements such as cadmium, radioactive elements such as thorium or toxic elements such as arsenic. Further, desirably, they do not contain any fluorine in view of volatilization during melting of the glass.

The optical glass (any one of the optical glasses I, II and III) of the present invention can be produced, for example, by formulating material compounds and melting, refining, stirring and homogenizing the formulated glass material according to a conventional method.

Further, a glass melt that gives any one of the optical glasses (I, II and III) of the present invention is allowed to flow into a 40×70×15 mm mold made of carbon, allowed to gradually cool to a glass transition temperature, then annealed at the glass transition temperature for 1 hour and allowed to cool to room temperature to obtain a glass. In this case, there is precipitated no crystal that is observable through a microscope. As described above, the optical glass (any one of the optical glasses I, II and III) of the present invention is excellent in stability.

The optical glass of the present invention is transparent in a visible light region and suitable for producing a lens, a prism and other optical elements.

A precision press molding preform made of the optical glass (any one of the optical glasses I, II and III) of the present invention and a method of preparing the same will be explained below.

The precision press molding preform refers to a pre-shaped glass material to be precision press molded under heat. As is already explained, the precision press molding is a method in which an optical-function surface is formed by press molding, whereby an optical element as an end article (final product) is produced without any polishing or lapping. When no removing processing like polishing and lapping is not carried out in any other portion than the optical-function surface of a precision press molded article, the weight of the preform is adjusted such that it is equivalent to the weight of an end article (final product). The weight of a precision press molded article is also equivalent to this weight. When the weight of a preform is smaller than the weight of an end precision press molded article, the glass is not fully charged in the molding surface of a press-shaping mold during its precision press molding, and there is caused a problem that no intended surface accuracy can be obtained or that the thickness of a molded article is smaller than an intended thickness. Further, when the weight of a preform is larger than the weight of an end precision press molded article, there is caused a problem that excess glass penetrate gaps of precision press mold members to form burrs, or that a molded article has a larger thickness than an intended thickness. It is therefore required to control the weight of a precision press molding preform more accurately than the weight of any general press molding glass material that is finished by polishing or lapping after press molded. In the precision press molding preform, further, the surface of the preform is left on an end article as a press molded article surface, so that the surface of the preform is required to be free of a flaw and soiling.

The method for producing the above precision press molding preform includes a method in which a molten glass is allowed to flow, a molten glass gob having a predetermined weight is separated, and the molten glass gob is shaped into a preform (to be referred to as "hot shaping method" hereinafter) and a method in which a molten glass is cast into a mold, a shaped glass is cooled, and the obtained glass gob is machined to a predetermined size (to be referred to as "cold shaping method" hereinafter).

In the hot shaping method, a molten glass which is prepared by melting, clarification and homogenization and which has, for example, a temperature of approximately 1,000 to 1,400° C. and a viscosity of approximately 0.1 to 5 dPa·s is prepared, the temperature of the above molten glass is adjusted such that the molten glass has a viscosity of approximately 3 to 60 dPa·s, and the molten glass is allowed to flow out of a flow nozzle or a flow pipe, to shape it into a preform. The method of adjusting the above temperature includes, for example, a method in which the temperature of the flow nozzle or the flow pipe is controlled. The flow nozzle or flow pipe is desirably made of platinum or a platinum alloy. The method of shaping the molten glass into a preform specifically includes a method in which molten glass is dropped from the flow nozzle as a molten glass drop having a predetermined weight and the molten glass drop is received with a receiving member and shaped into a preform, a method in which the above molten glass drop having a predetermined weight is dropped from the above flow nozzle into liquid nitrogen and shaped into a preform, and a method in which a molten glass flow is allowed to flow down from the flow pipe made of platinum or a platinum alloy, a forward end portion of the molten glass flow is received with a receiving member, a constricted portion is formed in a molten glass flow portion between the nozzle and the receiving member, molten glass flow is separated in the constricted portion, and a molten glass gob having a predetermined weight is received with the receiving member and shaped into a preform. When the molten glass is dropped, the glass preferably has a viscosity of 3 to 30 dPa·s. When the molten glass is flowed down as a molten glass flow, the glass preferably has a viscosity of 2 to 60 dPa·s.

The form of the preform can be determined by taking account of the form of precision press molded article. Examples of the form of the preform preferably include a spherical form and an oval form. In the hot shaping method, a preform having a smooth surface can be easily obtained since the surface of the preform is formed when the glass has a softening temperature or higher. Particularly, in a method in which a molten glass gob is shaped into a preform while floated above a shaping mold with air pressure, or a method in which a molten glass gob is placed into, and shaped into a preform in, a medium prepared by cooling a substance that is a gas at an ordinary temperature under ordinary pressure into a liquid, there can be easily produced a preform having a smooth surface free of flaws, soling and surface alteration, for example, a preform having a free surface.

In the cold shaping method, for example, the above molten glass prepared by melting, refining and homogenization is cast into a casting mold, shaped into the form of a glass block, the glass block is gradually cooled to decrease strain of the glass, then, the glass block is machined or cut to prepare a glass gob having predetermined dimensions and a predetermined weight, and the glass gob is surface-smoothened to give a preform.

The method of precision press molding the above preform to produce an optical element will be explained below.

The precision press molding uses a press-shaping mold having a molding surface that is accurately processed beforehand so as to have a desired form, and a release film may be formed on the molding surface for preventing the fusion of the glass during pressing. The precision press molding can be carried out by a known method including precision press molding in an atmosphere of a non-oxidizing gas such as nitrogen gas for preventing damage of the molding surface, such as damage by oxidation.

In the above manner, various lenses such as a spherical lens, an aspherical lens, a micro lens, a lens array, a micro lens array, etc., and optical elements such as a prism, a polygonal mirror, etc., can be produced from the optical glass (any one of the optical glasses I, II, and III) of the present invention without machining their optical-function surfaces.

EXAMPLES

The present invention will be explained more specifically with reference to Examples hereinafter, while the present invention shall not be limited to these Examples.

Examples 1-64

Oxides, carbonates, sulfates, nitrates, hydroxides, etc., such as $SiO_2$, $H_3BO_3$, $La_2O_3$, ZnO, $ZnCO_3$, $ZrO_2$, $Li_2CO_3$, etc., as raw materials were provided, and 250 to 300 g of each of these components was weighed so as to form compositions shown in Tables 1 to 7. These raw materials in each Example were fully mixed to prepare a formulated batch, the formulated batch was placed in a platinum crucible, and the formulated batch was melted in air in an electric furnace maintained at 1,200 to 1,450° C., with stirring for 2 to 4 hours. After melted, the glass melt was allowed to flow into a 40×70×15 mm mold made of carbon and allowed to cool to a glass transition temperature, and immediately thereafter, the glass was placed in an annealing furnace and annealed in a glass transition temperature range for about 1 hour. Then, the glass in the furnace was allowed to cool to room temperature, to give an optical glass. In the thus-obtained optical glasses, there was precipitated no crystal that was observable through a microscope.

Each optical glass was measured for properties according to the following methods. Tables 1 to 7 shows the results.

(1) Refractive Index (nd) and Abbe's Number (vd)

An optical glass held at a temperature between Tg and Ts was temperature-decreased at a temperature decrease rate of −30° C./hour, and the optical glass was measured for a refractive index (nd) and an Abbe's number (vd).

(2) Glass Transition Temperature (Tg) and Sag Temperature (Ts)

An optical glass was measured at a temperature elevation rate of 4° C./minute with a thermomechanical analyzer supplied by Rigaku Denki K.K.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Glass compo-sition (mol %) | $B_2O_3$ | 32.28 | 35.48 | 33.86 | 33.33 | 35.20 | 34.65 | 35.48 | 35.63 | 30.28 | 31.62 |
| | $SiO_2$ | 9.45 | 9.68 | 9.45 | 9.52 | 9.60 | 9.45 | 9.68 | 9.72 | 9.56 | 9.49 |
| | $La_2O_3$ | 9.06 | 9.27 | 7.87 | 9.13 | 9.20 | 9.06 | 8.06 | 8.10 | 10.36 | 9.49 |
| | $Gd_2O_3$ | 9.06 | 9.27 | 7.87 | 9.13 | 9.20 | 9.06 | 8.06 | 8.10 | 10.36 | 9.49 |
| | ZnO | 28.35 | 24.19 | 28.35 | 28.57 | 25.60 | 28.35 | 22.58 | 22.67 | 22.31 | 23.72 |
| | $Li_2O$ | 3.94 | 4.03 | 3.94 | 3.97 | 4.00 | 2.36 | 5.65 | 5.67 | 5.58 | 5.53 |
| | $ZrO_2$ | 4.72 | 4.84 | 4.72 | 3.17 | 4.80 | 4.72 | 6.45 | 5.67 | 3.98 | 3.95 |
| | $Ta_2O_5$ | 3.15 | 3.23 | 3.15 | 3.17 | 2.40 | 2.36 | 4.03 | 3.64 | 2.79 | 1.98 |
| | $WO_3$ | 0.00 | 0.00 | 0.00 | 0.00 | 0.00 | 0.00 | 0.00 | 0.00 | 4.78 | 4.74 |
| | $Y_2O_3$ | 0.00 | 0.00 | 0.00 | 0.00 | 0.00 | 0.00 | 0.00 | 0.00 | 0.00 | 0.00 |
| | $Yb_2O_3$ | 0.00 | 0.00 | 0.00 | 0.00 | 0.00 | 0.00 | 0.00 | 0.00 | 0.00 | 0.00 |
| | $Nb_2O_5$ | 0.00 | 0.00 | 0.79 | 0.00 | 0.00 | 0.00 | 0.00 | 0.81 | 0.00 | 0.00 |
| | BaO | 0.00 | 0.00 | 0.00 | 0.00 | 0.00 | 0.00 | 0.00 | 0.00 | 0.00 | 0.00 |
| | $TiO_2$ | 0.00 | 0.00 | 0.00 | 0.00 | 0.00 | 0.00 | 0.00 | 0.00 | 0.00 | 0.00 |
| | $(\Sigma Ln_2O_3)$ | (18.12) | (18.54) | (15.74) | (18.26) | (18.40) | (18.12) | (16.12) | (16.20) | (20.72) | (18.98) |
| | $(La_2O_3/\Sigma Ln_2O_3)$ | (0.50) | (0.50) | (0.50) | (0.50) | (0.50) | (0.50) | (0.50) | (0.50) | (0.50) | (0.50) |
| | $(Li_2O + ZnO)$ | (32.28) | (28.23) | (32.28) | (32.54) | (29.60) | (30.71) | (28.23) | (28.34) | (27.89) | (29.25) |
| | $(La_2O_3 + Gd_2O_3)$ | (18.12) | (18.54) | (15.74) | (18.26) | (18.40) | (18.12) | (16.12) | (16.20) | (20.72) | (18.98) |
| | Total | 100.0 | 100.0 | 100.0 | 100.0 | 100.0 | 100.0 | 100.0 | 100.0 | 100.0 | 100.0 |
| Properties | Tg(TMA)(° C.) | 566 | 573 | 556 | 564 | 570 | 577 | 562 | 561 | 565 | 556 |
| | Ts(° C.) | 616 | 623 | 606 | 614 | 620 | 627 | 612 | 611 | 615 | 606 |
| | nd | 1.81751 | 1.81014 | 1.81033 | 1.81032 | 1.81040 | 1.80680 | 1.80756 | 1.81001 | 1.84150 | 1.82528 |
| | vd | 43.95 | 44.51 | 43.26 | 44.40 | 44.50 | 44.97 | 43.77 | 43.20 | 40.85 | 41.79 |
| | Specific gravity | 5.08 | 5.00 | 4.92 | 5.05 | 5.01 | 4.99 | 4.91 | 4.87 | 5.30 | 5.13 |

Note)
$(La_2O_3/\Sigma Ln_2O_3)$ = ratio of molar amounts

TABLE 2

| | | Example | | | | | | | | | |
|---|---|---|---|---|---|---|---|---|---|---|---|
| | | 11 | 12 | 13 | 14 | 15 | 16 | 17 | 18 | 19 | 20 |
| Glass compo-sition (mol %) | $B_2O_3$ | 30.83 | 30.28 | 31.08 | 30.52 | 25.29 | 24.90 | 31.33 | 31.58 | 31.08 | 25.68 |
| | $SiO_2$ | 9.49 | 9.56 | 9.56 | 9.64 | 18.39 | 16.60 | 9.64 | 9.72 | 9.56 | 15.56 |
| | $La_2O_3$ | 9.88 | 9.96 | 9.96 | 10.44 | 11.11 | 15.77 | 10.84 | 11.74 | 11.55 | 12.06 |
| | $Gd_2O_3$ | 9.88 | 9.96 | 9.96 | 10.44 | 11.11 | 9.54 | 10.84 | 11.74 | 11.55 | 12.06 |
| | ZnO | 22.13 | 22.31 | 20.72 | 20.88 | 19.92 | 8.30 | 20.88 | 17.81 | 20.72 | 20.23 |

TABLE 2-continued

| | | \multicolumn{10}{c}{Example} |
|---|---|---|---|---|---|---|---|---|---|---|---|
| | | 11 | 12 | 13 | 14 | 15 | 16 | 17 | 18 | 19 | 20 |
| | $Li_2O$ | 5.53 | 5.58 | 5.58 | 5.62 | 2.30 | 9.96 | 4.02 | 4.05 | 2.39 | 2.33 |
| | $ZrO_2$ | 4.74 | 3.98 | 5.58 | 4.02 | 3.83 | 3.32 | 4.02 | 4.05 | 3.98 | 3.89 |
| | $Ta_2O_5$ | 1.98 | 3.59 | 2.79 | 3.61 | 3.45 | 4.15 | 3.61 | 2.83 | 2.79 | 3.50 |
| | $WO_3$ | 5.53 | 4.78 | 4.78 | 4.82 | 4.60 | 5.81 | 4.82 | 6.48 | 6.37 | 4.67 |
| | $Y_2O_3$ | 0.00 | 0.00 | 0.00 | 0.00 | 0.00 | 1.66 | 0.00 | 0.00 | 0.00 | 0.00 |
| | $Yb_2O_3$ | 0.00 | 0.00 | 0.00 | 0.00 | 0.00 | 0.00 | 0.00 | 0.00 | 0.00 | 0.00 |
| | $Nb_2O_5$ | 0.00 | 0.00 | 0.00 | 0.00 | 0.00 | 0.00 | 0.00 | 0.00 | 0.00 | 0.00 |
| | BaO | 0.00 | 0.00 | 0.00 | 0.00 | 0.00 | 0.00 | 0.00 | 0.00 | 0.00 | 0.00 |
| | $TiO_2$ | 0.00 | 0.00 | 0.00 | 0.00 | 0.00 | 0.00 | 0.00 | 0.00 | 0.00 | 0.00 |
| | $(\Sigma Ln_2O_3)$ | (19.76) | (19.92) | (19.92) | (20.88) | (22.22) | (26.97) | (21.69) | (23.48) | (23.10) | (24.12) |
| | $(La_2O_3/\Sigma Ln_2O_3)$ | (0.50) | (0.50) | (0.50) | (0.50) | (0.50) | (0.58) | (0.50) | (0.50) | (0.50) | (0.50) |
| | $(Li_2O + ZnO)$ | (27.67) | (27.89) | (26.29) | (26.51) | (22.22) | (18.26) | (24.90) | (21.86) | (23.11) | (22.57) |
| | $(La_2O_3 + Gd_2O_3)$ | (19.76) | (19.92) | (19.92) | (20.88) | (22.22) | (25.31) | (21.68) | (23.48) | (23.10) | (24.12) |
| | 合計量 | 100.0 | 100.0 | 100.0 | 100.0 | 100.0 | 100.0 | 100.0 | 100.0 | 100.0 | 100.0 |
| Properties | Tg(TMA)(° C.) | 560 | 563 | 565 | 569 | 612 | 592 | 578 | 589 | 597 | 616 |
| | Ts(° C.) | 610 | 613 | 615 | 619 | 662 | 647 | 639 | 628 | 647 | 669 |
| | nd | 1.83660 | 1.84383 | 1.84096 | 1.84685 | 1.84905 | 1.83226 | 1.85065 | 1.85595 | 1.85922 | 1.86308 |
| | νd | 41.46 | 40.45 | 40.92 | 40.52 | 40.72 | 39.97 | 40.53 | 40.15 | 40.02 | 40.50 |
| | Specific gravity | 5.21 | 5.31 | 5.24 | 5.34 | 5.41 | 5.43 | 5.39 | 5.45 | 5.48 | 5.55 |

Note)
$(La_2O_3/\Sigma Ln_2O_3)$ = ratio of molar amounts

TABLE 3

| | | \multicolumn{10}{c}{Example} |
|---|---|---|---|---|---|---|---|---|---|---|---|
| | | 21 | 22 | 23 | 24 | 25 | 26 | 27 | 28 | 29 | 30 |
| Glass composition (mol %) | $B_2O_3$ | 26.88 | 23.35 | 24.90 | 24.03 | 23.94 | 23.62 | 25.00 | 24.19 | 24.90 | 24.31 |
| | $SiO_2$ | 12.65 | 18.68 | 16.06 | 15.50 | 15.44 | 15.75 | 16.13 | 16.13 | 16.06 | 15.69 |
| | $La_2O_3$ | 12.65 | 12.45 | 12.85 | 12.79 | 11.97 | 12.99 | 12.90 | 12.90 | 12.85 | 12.55 |
| | $Gd_2O_3$ | 12.65 | 12.45 | 12.85 | 12.79 | 11.97 | 12.99 | 12.90 | 12.90 | 12.85 | 12.55 |
| | ZnO | 20.55 | 17.12 | 14.46 | 20.16 | 20.08 | 17.32 | 12.90 | 12.90 | 14.46 | 14.12 |
| | $Li_2O$ | 2.37 | 3.89 | 6.43 | 2.33 | 2.32 | 3.94 | 6.45 | 7.26 | 6.43 | 6.27 |
| | $ZrO_2$ | 3.95 | 3.98 | 4.02 | 3.88 | 5.41 | 4.72 | 4.84 | 4.84 | 4.02 | 3.92 |
| | $Ta_2O_5$ | 3.56 | 3.50 | 3.61 | 3.88 | 4.25 | 3.94 | 4.03 | 4.03 | 2.81 | 1.18 |
| | $WO_3$ | 4.74 | 4.67 | 4.82 | 4.65 | 4.63 | 4.72 | 4.84 | 4.84 | 4.82 | 4.71 |
| | $Y_2O_3$ | 0.00 | 0.00 | 0.00 | 0.00 | 0.00 | 0.00 | 0.00 | 0.00 | 0.00 | 0.00 |
| | $Yb_2O_3$ | 0.00 | 0.00 | 0.00 | 0.00 | 0.00 | 0.00 | 0.00 | 0.00 | 0.00 | 0.00 |
| | $Nb_2O_5$ | 0.00 | 0.00 | 0.00 | 0.00 | 0.00 | 0.00 | 0.00 | 0.00 | 0.00 | 0.00 |
| | BaO | 0.00 | 0.00 | 0.00 | 0.00 | 0.00 | 0.00 | 0.00 | 0.00 | 0.00 | 0.00 |
| | $TiO_2$ | 0.00 | 0.00 | 0.00 | 0.00 | 0.00 | 0.00 | 0.00 | 0.00 | 0.00 | 4.71 |
| | $(\Sigma Ln_2O_3)$ | (25.30) | (24.90) | (25.70) | (25.58) | (23.94) | (25.98) | (25.80) | (25.80) | (25.70) | (25.10) |
| | $(La_2O_3/\Sigma Ln_2O_3)$ | (0.50) | (0.50) | (0.50) | (0.50) | (0.50) | (0.50) | (0.50) | (0.50) | (0.50) | (0.50) |
| | $(Li_2O + ZnO)$ | (22.92) | (21.01) | (20.88) | (22.48) | (22.39) | (21.26) | (19.35) | (20.16) | (20.88) | (20.39) |
| | $(La_2O_3 + Gd_2O_3)$ | (25.30) | (24.90) | (25.70) | (25.58) | (23.94) | (25.98) | (25.80) | (25.80) | (25.70) | (25.10) |
| | Total | 100.0 | 100.0 | 100.0 | 100.0 | 100.0 | 100.0 | 100.0 | 100.0 | 100.0 | 100.0 |
| Properties | Tg(TMA)(° C.) | 617 | 612 | 597 | 617 | 623 | 620 | 605 | 604 | 600 | 599 |
| | Ts(° C.) | 665 | 662 | 652 | 671 | 673 | 670 | 659 | 663 | 655 | 655 |
| | nd | 1.87132 | 1.86218 | 1.86398 | 1.88085 | 1.87673 | 1.87726 | 1.86734 | 1.86865 | 1.86405 | 1.86841 |
| | νd | 39.97 | 40.29 | 40.51 | 39.82 | 39.19 | 39.64 | 40.04 | 39.92 | 40.10 | 38.82 |
| | Specific gravity | 5.63 | 5.55 | 5.55 | 5.65 | 5.65 | 5.68 | 5.57 | 5.58 | 5.49 | 5.34 |

Note)
$(La_2O_3/\Sigma Ln_2O_3)$ = ratio of molar amounts

TABLE 4

| | | \multicolumn{10}{c}{Example} |
|---|---|---|---|---|---|---|---|---|---|---|---|
| | | 31 | 32 | 33 | 34 | 35 | 36 | 37 | 38 | 39 | 40 |
| Glass composition (mol %) | $B_2O_3$ | 24.90 | 24.51 | 24.90 | 24.90 | 24.10 | 24.10 | 25.51 | 24.49 | 24.69 | 24.49 |
| | $SiO_2$ | 16.06 | 15.81 | 16.06 | 16.06 | 16.06 | 16.06 | 16.46 | 16.33 | 16.46 | 16.33 |
| | $La_2O_3$ | 12.85 | 11.86 | 12.05 | 12.05 | 12.85 | 12.85 | 12.35 | 12.24 | 12.35 | 12.24 |
| | $Gd_2O_3$ | 12.85 | 11.86 | 12.05 | 12.05 | 12.85 | 12.85 | 12.35 | 12.24 | 12.35 | 12.24 |
| | ZnO | 14.46 | 14.23 | 14.46 | 14.46 | 14.46 | 14.46 | 9.88 | 11.43 | 9.88 | 9.80 |
| | $Li_2O$ | 6.43 | 6.32 | 6.43 | 6.43 | 6.43 | 6.43 | 9.05 | 8.98 | 9.05 | 8.98 |
| | $ZrO_2$ | 4.02 | 3.95 | 4.02 | 4.02 | 4.02 | 4.02 | 4.12 | 4.08 | 4.12 | 4.08 |

TABLE 4-continued

|  |  | Example | | | | | | | | | |
|---|---|---|---|---|---|---|---|---|---|---|---|
|  |  | 31 | 32 | 33 | 34 | 35 | 36 | 37 | 38 | 39 | 40 |
|  | $Ta_2O_5$ | 3.61 | 3.56 | 3.61 | 3.61 | 3.61 | 3.61 | 3.70 | 3.67 | 4.53 | 3.67 |
|  | $WO_3$ | 0.00 | 4.74 | 4.82 | 4.82 | 4.82 | 4.82 | 4.94 | 4.90 | 4.94 | 6.53 |
|  | $Y_2O_3$ | 0.00 | 0.00 | 1.61 | 0.00 | 0.80 | 0.00 | 1.65 | 1.63 | 1.65 | 1.63 |
|  | $Yb_2O_3$ | 0.00 | 0.00 | 0.00 | 1.61 | 0.00 | 0.80 | 0.00 | 0.00 | 0.00 | 0.00 |
|  | $Nb_2O_5$ | 0.00 | 0.00 | 0.00 | 0.00 | 0.00 | 0.00 | 0.00 | 0.00 | 0.00 | 0.00 |
|  | BaO | 0.00 | 3.16 | 0.00 | 0.00 | 0.00 | 0.00 | 0.00 | 0.00 | 0.00 | 0.00 |
|  | $TiO_2$ | 4.82 | 0.00 | 0.00 | 0.00 | 0.00 | 0.00 | 0.00 | 0.00 | 0.00 | 0.00 |
|  | $(\Sigma Ln_2O_3)$ | (25.70) | (23.72) | (25.71) | (25.71) | (26.50) | (26.50) | (26.35) | (26.11) | (26.35) | (26.11) |
|  | $(La_2O_3/\Sigma Ln_2O_3)$ | (0.50) | (0.50) | (0.47) | (0.47) | (0.48) | (0.48) | (0.47) | (0.47) | (0.47) | (0.47) |
|  | $(Li_2O + ZnO)$ | (20.88) | (20.55) | (20.88) | (20.88) | (20.88) | (20.88) | (18.93) | (20.41) | (18.93) | (18.78) |
|  | $(La_2O_3 + Gd_2O_3)$ | (25.70) | (23.72) | (24.10) | (24.10) | (25.70) | (25.70) | (24.70) | (24.48) | (24.70) | (24.48) |
|  | Total | 100.0 | 100.0 | 100.0 | 100.0 | 100.0 | 100.0 | 100.0 | 100.0 | 100.0 | 100.0 |
| Properties | Tg(TMA)(° C.) | 604 | 596 | 603 | 603 | 608 | 609 | 595 | 594 | 600 | 595 |
|  | Ts(° C.) | 662 | 653 | 659 | 660 | 665 | 664 | 651 | 652 | 657 | 652 |
|  | nd | 1.86574 | 1.85564 | 1.86200 | 1.86258 | 1.86818 | 1.86809 | 1.85642 | 1.85949 | 1.86360 | 1.86420 |
|  | νd | 40.42 | 40.40 | 40.32 | 40.25 | 40.27 | 40.19 | 40.82 | 40.60 | 40.01 | 39.68 |
|  | Specific gravity | 5.40 | 5.50 | 5.50 | 5.60 | 5.57 | 5.63 | 5.44 | 5.47 | 5.51 | 5.50 |

Note)
$(La_2O_3/\Sigma Ln_2O_3)$ = ratio of molar amounts

TABLE 5

|  |  | Example | | | | | | | | | |
|---|---|---|---|---|---|---|---|---|---|---|---|
|  |  | 41 | 42 | 43 | 44 | 45 | 46 | 47 | 48 | 49 | 50 |
| Glass composition (mol %) | $B_2O_3$ | 25.10 | 24.69 | 24.49 | 24.20 | 24.49 | 24.59 | 25.00 | 25.10 | 25.51 | 25.10 |
|  | $SiO_2$ | 16.74 | 16.46 | 16.33 | 16.13 | 16.33 | 16.39 | 16.39 | 16.19 | 16.46 | 16.19 |
|  | $La_2O_3$ | 12.55 | 12.35 | 12.24 | 15.32 | 17.14 | 15.57 | 15.57 | 15.38 | 15.64 | 14.57 |
|  | $Gd_2O_3$ | 12.55 | 12.35 | 12.24 | 8.87 | 7.35 | 9.43 | 9.02 | 8.91 | 9.05 | 11.34 |
|  | ZnO | 5.05 | 9.88 | 9.80 | 9.68 | 9.80 | 9.84 | 9.84 | 12.96 | 9.88 | 12.96 |
|  | $Li_2O$ | 11.72 | 9.05 | 8.98 | 8.87 | 8.98 | 9.02 | 9.02 | 7.29 | 9.05 | 7.29 |
|  | $ZrO_2$ | 4.18 | 4.12 | 4.08 | 4.03 | 4.08 | 3.28 | 3.28 | 3.24 | 3.29 | 4.05 |
|  | $Ta_2O_5$ | 3.77 | 4.53 | 3.67 | 3.63 | 3.67 | 3.69 | 3.69 | 3.64 | 3.70 | 3.64 |
|  | $WO_3$ | 6.69 | 4.94 | 6.53 | 6.45 | 6.53 | 6.56 | 6.56 | 5.67 | 5.76 | 4.86 |
|  | $Y_2O_3$ | 1.67 | 0.00 | 0.00 | 2.81 | 1.63 | 1.64 | 0.00 | 1.62 | 1.65 | 0.00 |
|  | $Yb_2O_3$ | 0.00 | 1.65 | 1.63 | 0.00 | 0.00 | 0.00 | 1.64 | 0.00 | 0.00 | 0.00 |
|  | $Nb_2O_5$ | 0.00 | 0.00 | 0.00 | 0.00 | 0.00 | 0.00 | 0.00 | 0.00 | 0.00 | 0.00 |
|  | BaO | 0.00 | 0.00 | 0.00 | 0.00 | 0.00 | 0.00 | 0.00 | 0.00 | 0.00 | 0.00 |
|  | $TiO_2$ | 0.00 | 0.00 | 0.00 | 0.00 | 0.00 | 0.00 | 0.00 | 0.00 | 0.00 | .00 |
|  | $(\Sigma Ln_2O_3)$ | (26.79) | (26.35) | (26.11) | (27.00) | (26.12) | (26.64) | (26.23) | (25.91) | (26.34) | (25.91) |
|  | $(La_2O_3/\Sigma Ln_2O_3)$ | (0.47) | (0.47) | (0.47) | (0.57) | (0.66) | (0.58) | (0.59) | (0.59) | (0.59) | (0.56) |
|  | $(Li_2O + ZnO)$ | (16.74) | (18.93) | (18.78) | (18.55) | (18.78) | (18.85) | (18.85) | (20.24) | (18.93) | (20.24) |
|  | $(La_2O_3 + Gd_2O_3)$ | (25.10) | (24.70) | (24.48) | (24.19) | (24.49) | (25.00) | (24.59) | (24.29) | (24.69) | (25.91) |
|  | Total | 100.0 | 100.0 | 100.0 | 100.0 | 100.0 | 100.0 | 100.0 | 100.0 | 100.0 | 100.0 |
| Properties | Tg(TMA)(° C.) | 597 | 599 | 597 | 598 | 591 | 594 | 590 | 594 | 589 | 597 |
|  | Ts(° C.) | 640 | 655 | 653 | 655 | 646 | 649.6 | 647 | 651 | 645 | 654 |
|  | nd | 1.85901 | 1.86382 | 1.86456 | 1.86702 | 1.86545 | 1.86435 | 1.86180 | 1.86093 | 1.85775 | 1.86212 |
|  | νd | 39.92 | 40.10 | 39.60 | 39.68 | 39.57 | 39.83 | 39.86 | 40.17 | 40.31 | 40.44 |
|  | Specific gravity | 5.45 | 5.60 | 5.60 | 5.43 | 5.39 | 5.44 | 5.41 | 5.42 | 5.38 | 5.48 |

Note)
$(La_2O_3/\Sigma Ln_2O_3)$ = ratio of molar amounts

TABLE 6

|  |  | Example | | | | | | | |
|---|---|---|---|---|---|---|---|---|---|
|  |  | 51 | 52 | 53 | 54 | 55 | 56 | 57 | 58 |
| Glass composition (mol %) | $B_2O_3$ | 25.10 | 25.10 | 25.10 | 24.70 | 24.80 | 24.90 | 28.24 | 26.29 |
|  | $SiO_2$ | 16.19 | 16.19 | 16.19 | 15.94 | 16.00 | 16.06 | 12.55 | 15.94 |
|  | $La_2O_3$ | 12.96 | 14.57 | 15.38 | 14.34 | 14.40 | 14.46 | 10.20 | 11.16 |
|  | $Gd_2O_3$ | 11.34 | 9.72 | 8.91 | 9.56 | 9.60 | 9.64 | 10.20 | 11.16 |
|  | ZnO | 12.96 | 12.96 | 12.96 | 14.34 | 13.60 | 12.85 | 23.53 | 19.12 |
|  | $Li_2O$ | 7.29 | 7.29 | 7.29 | 7.17 | 7.60 | 8.03 | 5.49 | 7.17 |
|  | $ZrO_2$ | 3.24 | 3.24 | 3.24 | 3.19 | 3.20 | 3.21 | 5.49 | 3.98 |
|  | $Ta_2O_5$ | 3.64 | 3.64 | 3.64 | 3.59 | 3.60 | 3.61 | 2.74 | 3.59 |
|  | $WO_3$ | 5.67 | 5.67 | 5.67 | 5.58 | 5.60 | 5.62 | 1.57 | 1.59 |

TABLE 6-continued

|  |  | Example | | | | | | | |
|---|---|---|---|---|---|---|---|---|---|
|  |  | 51 | 52 | 53 | 54 | 55 | 56 | 57 | 58 |
|  | $Y_2O_3$ | 0.81 | 0.81 | 0.81 | 0.80 | 0.80 | 0.80 | 0.00 | 0.00 |
|  | $Yb_2O_3$ | 0.81 | 0.81 | 0.81 | 0.80 | 0.80 | 0.80 | 0.00 | 0.00 |
|  | $Nb_2O_5$ | 0.00 | 0.00 | 0.00 | 0.00 | 0.00 | 0.00 | 0.00 | 0.00 |
|  | BaO | 0.00 | 0.00 | 0.00 | 0.00 | 0.00 | 0.00 | 0.00 | 0.00 |
|  | $TiO_2$ | 0.00 | 0.00 | 0.00 | 0.00 | 0.00 | 0.00 | 0.00 | 0.00 |
|  | $(\Sigma Ln_2O_3)$ | (25.92) | (25.91) | (25.91) | (25.50) | (25.60) | (25.70) | (20.40) | (22.31) |
|  | $(La_2O_3/\Sigma Ln_2O_3)$ | (0.50) | (0.56) | (0.59) | (0.56) | (0.56) | (0.56) | (0.50) | (0.50) |
|  | $(Li_2O + ZnO)$ | (20.24) | (20.24) | (20.24) | (21.51) | (21.20) | (20.88) | (29.02) | (26.29) |
|  | $(La_2O_3 + Gd_2O_3)$ | (24.30) | (24.29) | (24.29) | (23.90) | (24.00) | (24.10) | (20.40) | (22.32) |
|  | Total | 100.0 | 100.0 | 100.0 | 100.0 | 100.0 | 100.0 | 100.0 | 100.0 |
| Properties | Tg(TMA)(° C.) | 598 | 594 | 595 | 592 | 592 | 589 | 579 | 567 |
|  | Ts(° C.) | 656 | 650 | 650 | 648 | 648 | 644 | 635 | 621 |
|  | nd | 1.86083 | 1.86147 | 1.86156 | 1.86164 | 1.86078 | 1.85964 | 1.83553 | 1.83327 |
|  | vd | 40.19 | 40.22 | 40.15 | 40.04 | 40.32 | 40.11 | 42.80 | 42.78 |
|  | Specific gravity | 5.52 | 5.49 | 5.47 | 5.49 | 5.48 | 5.47 | 5.29 | 5.25 |

Note)
$(La_2O_3/\Sigma Ln_2O_3)$ = ratio of molar amounts

TABLE 7

|  |  | Example | | | | | |
|---|---|---|---|---|---|---|---|
|  |  | 59 | 60 | 61 | 62 | 63 | 64 |
| Glass | $B_2O_3$ | 31.33 | 30.28 | 30.16 | 29.92 | 29.92 | 30.95 |
| composition | $SiO_2$ | 9.64 | 11.16 | 11.11 | 11.02 | 11.02 | 9.52 |
| (mol %) | ZnO | 20.88 | 20.72 | 21.43 | 22.05 | 22.05 | 22.22 |
|  | $Li_2O$ | 4.02 | 3.98 | 3.97 | 3.94 | 3.94 | 3.97 |
|  | $La_2O_3$ | 13.25 | 13.94 | 13.49 | 12.99 | 12.99 | 13.10 |
|  | $Gd_2O_3$ | 8.43 | 7.57 | 7.14 | 6.69 | 6.69 | 6.75 |
|  | $ZrO_2$ | 4.02 | 3.98 | 3.97 | 3.94 | 4.72 | 4.76 |
|  | $Ta_2O_5$ | 3.61 | 3.59 | 3.97 | 3.94 | 3.94 | 3.97 |
|  | $Nb_2O_5$ | 0.00 | 0.00 | 0.00 | 0.00 | 0.00 | 0.00 |
|  | $TiO_2$ | 0.00 | 0.00 | 0.00 | 0.00 | 0.00 | 0.00 |
|  | $WO_3$ | 4.82 | 4.78 | 4.76 | 5.51 | 4.72 | 4.76 |
|  | $Y_2O_3$ | 0.00 | 0.00 | 0.00 | 0.00 | 0.00 | 0.00 |
|  | $Yb_2O_3$ | 0.00 | 0.00 | 0.00 | 0.00 | 0.00 | 0.00 |
|  | BaO | 0.00 | 0.00 | 0.00 | 0.00 | 0.00 | 0.00 |
|  | $(\Sigma Ln_2O_3)$ | (21.69) | (21.51) | (20.63) | (19.69) | (19.69) | (19.84) |
|  | $(La_2O_3/\Sigma Ln_2O_3)$ | (0.61) | (0.65) | (0.65) | (0.66) | (0.66) | (0.66) |
|  | $(Li_2O + ZnO)$ | (24.90) | (24.70) | (25.40) | (25.98) | (25.98) | (26.19) |
|  | Total | 100.0 | 100.0 | 100.0 | 100.0 | 100.0 | 100.0 |
| Properties | Tg(TMA)(° C.) | 586 | 586 | 583 | 581 | 580 | 579 |
|  | Ts(° C.) | 637 | 636 | 634 | 631 | 632 | 630 |
|  | nd | 1.85171 | 1.84790 | 1.84788 | 1.84739 | 1.84838 | 1.85052 |
|  | vd | 40.50 | 40.45 | 40.18 | 39.76 | 40.17 | 40.01 |
|  | Density | 5.34 | 5.29 | 5.29 | 5.27 | 5.26 | 5.28 |

Note)
$(La_2O_3/\Sigma Ln_2O_3)$ = ratio of molar amounts

As shown above, there can be obtained optical glasses for precision press molding, comprising $B_2O_3$, $SiO_2$, $La_2O_3$, $Gd_2O_3$, ZnO, $Li_2O$, $ZrO_2$ and $Ta_2O_5$, having a glass transition temperature of 630° C. or lower and having a refractive index nd and an Abbe's number vd which satisfy all of the following relational expressions, $1.80 < nd \leq 1.90$ $35 < vd \leq 50$, and $nd \geq 2.025 - (0.005 \times vd)$.

Example 65

Precision press molding preforms were produced from the optical glasses obtained in Examples 1 to 64 as follows. First, melting, refining and homogenization were carried out to obtain a molten glass that was to give one of the above optical glasses, the molten glass was dripped from a flow nozzle made of a platinum alloy toward a receiving member, and in a concave portion of the receiving member, the received molten glass drop was floated and rolled while a gas was ejected upward from a gas ejection port formed in a bottom of the concave portion, to shape the molten glass into a preform (Method 1). The thus-formed preforms from the above optical glasses had a weight equivalent to the weight of an intended end product, underwent no devitrification and had a smooth surface free of defects such as a flaw, soiling and alteration.

Separately, the same molten glass drop as above was dropped from the flow nozzle in the same manner as above into liquid nitrogen and shaped into a preform (Method 2).

Like the above preforms, each of the thus-obtained preforms underwent no devitrification, had high weight accuracy and had a smooth surface free of defects.

Further, the same molten glass as above was allowed to flow down from a flow pipe to form a molten glass flow, a lower end portion was received with a receiving mold member, a constricted portion was formed somewhere in the molten glass flow, and when a glass lower than the constricted portion came to have a predetermined weight value, the glass was separated in the constricted portion. The separated molten glass gob having the above weight was shaped into a preform with a receiving mold member (Method 3). Like the preforms obtained by the above Methods 1 and 2, each of the thus-obtained preforms underwent no devitrification, had high weight accuracy and had a smooth surface free of defects.

Example 66

Figure 2:
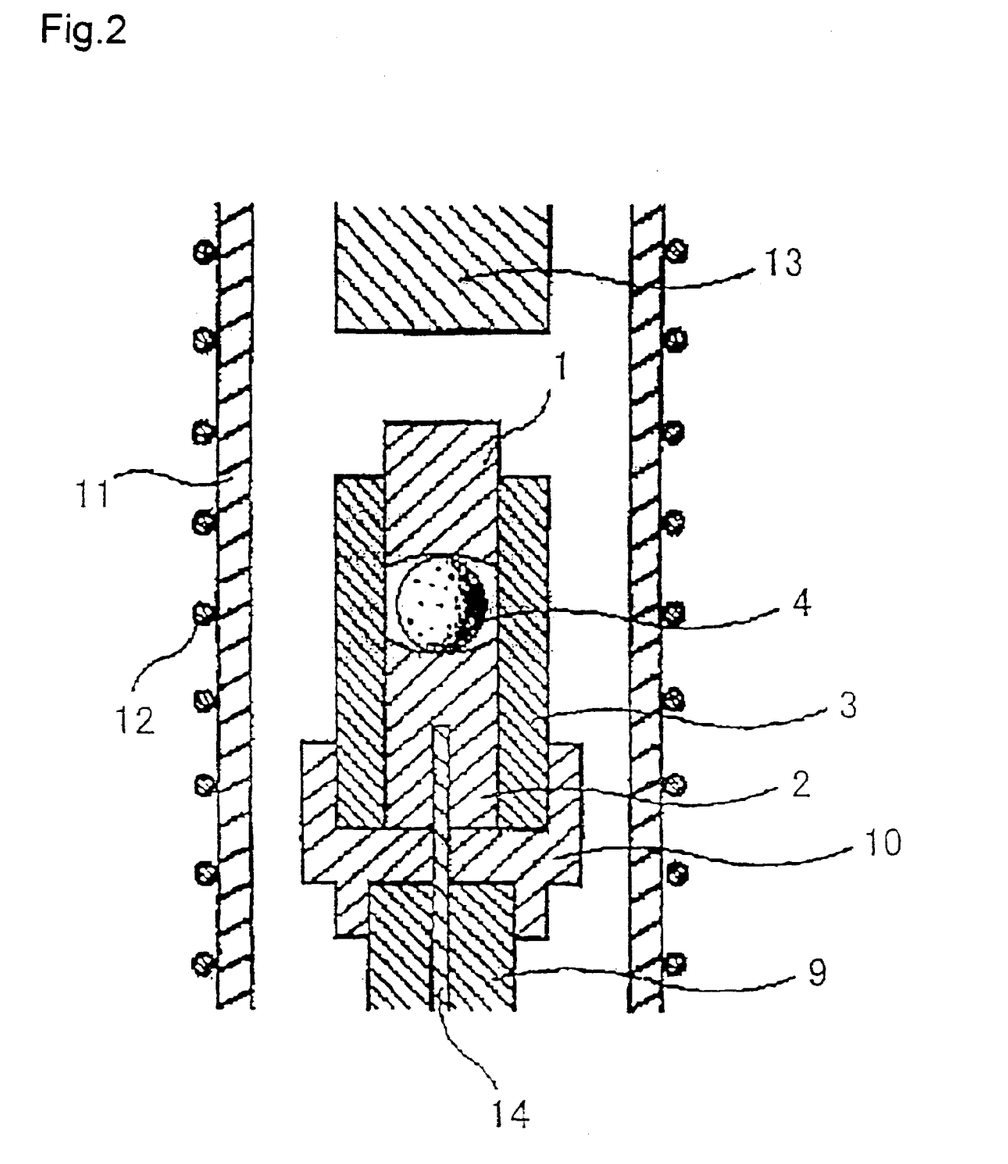
FIG. 2 is a schematic cross-sectional view of one example of a precision press molding apparatus used in Examples.

Each of the spherical preforms made of the optical glasses of Examples 1 to 64 obtained by Method 1 in Example 65 was heated and precision press molded (aspherical-precision pressed) with an apparatus shown in FIG. 2, to give aspherical lenses.

Particulars of the precision press molding were as follows. The preform 4 was placed between a lower mold member 2 and an upper mold member 1 which had an aspherical form and were made of SiC, then the atmosphere inside a quartz tube 11 was replaced with a nitrogen atmosphere inside, and an electric current was applied to heater 12 to heat the inside of the quartz tube 11. The temperature inside the shaping mold was set at a temperature between a sag temperature of the glass+20° C. and the sag temperature of the glass+80° C., and while this temperature was maintained, a press rod 13 was moved downward to press the upper mold member 1 thereby to press-mold the preform (molding glass gob) in the shaping mold. The press-molding was carried out under a molding pressure of 8 MPa for a molding time period of 30 seconds. After the press-molding, the molding pressure was decreased, and while the press-molded glass molded product was in contact with the lower mold member 2 and the upper mold member 1, the molded product was gradually cooled to a temperature that was the glass transition temperature −30° C. Then, the molded product was rapidly cooled to room temperature. Then, the glass molded as an aspherical lens was taken out of the shaping mold, and subjected to measurement of a form and inspection of an appearance. The thus-obtained aspherical lenses from the optical glasses in Examples 1 to 64 had remarkably high accuracy.

In FIG. 2, numeral 3 indicates a sleeve, numeral 9 indicates a support rod, numeral 10 indicates a support bed, and numeral 14 indicates a thermocouple.

Aspherical lenses made of the optical glasses in Examples 1 to 64 were obtained from the preforms prepared by Methods 2 and 3 in the same manner as above. Like the above spherical lenses, the thus-obtained spherical lenses had remarkably high accuracy. While the preforms used in this Example had the form of a sphere and had a diameter of 2 to 30 mm, the form and dimensions of the preform can be determined as required depending upon the form, etc., of a precision press molded product (article).

A press-shaping mold having a form suitable for producing an end product can give other lens or an optical element such as a prism or a polygonal mirror.

An anti-reflection film or an optical multi-layered film such as a high reflection film can be formed on the optical-function surface of the thus-obtained optical element as required.

EFFECT OF THE INVENTION

According to the present invention, there can be provided a precision press molding optical glass that has high-refractivity and low-dispersion properties and which is usable for the production of an optical element such as an ultra-precision aspherical lens without any machining, polishing or lapping, of the optical-function surface thereof after precision press molding.

According to the present invention, further, there can be also provided a precision press molding preform made of the above optical glass and a process for the production thereof, and there can be further provided an optical element made of the above optical glass and a process for the production of an optical element such as an aspherical lens, or the like, highly productively from the above preform by precision press molding.

What is claimed is:

1. An optical glass for precision press molding which comprises, by mol %,
15 to 40% of $B_2O_3$,
3 to 25% of $SiO_2$,
12 to 32% of a total of $La_2O_3$ and $Gd_2O_3$,
2 to 35% of ZnO,
0.5 to 15% of $Li_2O$,
0.5 to 15% of $ZrO_2$,
0.2 to 10% of $Ta_2O_5$,
0 to 12% of $WO_3$,
0 to 7% of $Y_2O_3$, and
0 to 1.65% of $Yb_2O_3$,
substantially containing none of PbO and $Lu_2O_3$, having a $B_2O_3$, $SiO_2$, $La_2O_3$, $Gd_2O_3$, ZnO, $Li_2O$, $ZrO_2$, $Ta_2O_5$, $WO_3$, $Y_2O_3$ and $Yb_2O_3$ total content of 95 mol % or more, having a glass transition temperature of 630° C. or lower, and having a refractive index nd and an Abbe's number vd which satisfy all of the following relational expressions, $$1.80 < nd \leq 1.90$$

$$35 < vd \leq 50, \text{ and}$$

$$nd \geq 2.025 - (0.005 \times vd).$$

2. The optical glass of claim 1, which has a refractive index nd of over 1.85 and an Abbe's number (vd) of larger than 35.

3. An optical glass for precision press molding as recited in claim 1 or claim 2, wherein the content of $Y_2O_3$ is 0 to 2.81 mol %.

4. A precision press-molding preform which is made of the optical glass recited in claim 1 or claim 2.

5. An optical element which is made of the optical glass recited in claim 1 or claim 2.

6. A process for the production of an optical element which comprises heating a preform made of an optical glass to soften the preform and producing the optical element from the softened preform by precision press-molding, said preform being the preform made of the optical glass recited in claim 1 or claim 2.

* * * * *